United States Patent [19]

Self

[11] Patent Number: 4,705,064

[45] Date of Patent: Nov. 10, 1987

[54] SAFETY SEAL FOR AN OPERATING LEVER

[76] Inventor: Freddy Self, 1933 Parkside Dr., Richmond, Calif. 94803

[21] Appl. No.: 895,794

[22] Filed: Aug. 12, 1986

[51] Int. Cl.4 ........................ F16K 35/00; A62C 23/10

[52] U.S. Cl. ................................ 137/384; 292/307 R; 169/75; 169/78

[58] Field of Search ........................... 292/307 R, 322; 137/384; 169/75, 88

[56] References Cited

U.S. PATENT DOCUMENTS 3,666,016 5/1972 Estes .............................. 292/307 R
3,702,637 11/1972 Bower ............................ 292/307 R
3,844,356 10/1974 Allen et al. ........................... 169/88
3,944,269 3/1976 Lundberg ....................... 292/307 R
4,088,194 5/1978 Hard ..................................... 169/75

*Primary Examiner*—A. Michael Chambers
*Attorney, Agent, or Firm*—Bielen & Peterson

[57] ABSTRACT

A safety seal for an operating lever utilizing a cap which is capable of covering at least one end of the lever pin extending to one side of the lever. The cap is connected to the other side of the lever pin by a tether. The cap and tether are reuseable as a seal.

4 Claims, 4 Drawing Figures

SAFETY SEAL FOR AN OPERATING LEVERcl

BACKGROUND OF THE INVENTION

The present invention relates to a novel and useful safety seal for an operating lever which is applicable to a fire extinguisher.

Operating levers for devices such as fire extinguishers are often immobilized by removable pins which are held in place by safety seals. The safety seals of the prior art may be broken, but are not reusable.

In emergency conditions, persons employing fire extinguishers have inadvertently bent the pin causing the pin to jam in the lever portion of the fire extinguisher, rendering the fire extinguisher inoperable. In addition, lever mechanisms of fire extinguishers have been rendered useless by recalcitrant pins. In addition, seals holding the safety pin for fire extinguisher in place have been broken and not replaced. Since every fire extinguisher includes a meter showing the charge of the fire extinguisher powder, disposable seals have not been replaced. As a result, it cannot be determined whether tampering of the fire extinguisher has occurred.

A safety seal for a fire extinguisher which would prevent damage to the same and be reusable would be a great advance in this field of fire safety.

SUMMARY OF THE INVENTION

In accordance with the present invention a novel and useful safety seal for an operating lever, particularly useful in a fire extinguisher mechanism, is provided. The safety seal of the present invention utilizes a pin which prevents the operation of the lever. The pin may be a conventional pin which is normally constructed of metallic material, or may be constructed of a more fragile material such as plastic, wood, and the like, which would be shearable when the lever is operated.

The safety seal of the present invention also includes a cap which is capable of covering at least part of one end portion of the lever pin which usually extends to one side of the lever. A cap would frictionally engage the end of the lever pin sufficiently to prevent disengagement under gravitational force, but allow disengagement by manual force. The cap may also include an opening therethrough such that the end pin passes completely through the cap and permits the cap to lie immediately adjacent the operating lever.

In addition, the safety seal of the present invention is constructed with a tether which is connected to the cap and extends to the other end of the lever pin which is normally positioned on the other side of the lever relative to the one end portion of the lever pin previously described. The tether is also connected to the other side of the lever pin and possesses sufficient length to permit removal of the cap from the one end of the lever pin when the lever pin is in place in the lever. Thus, the tether and cap are reusable as a seal.

The lever pin may also constitute part of the invention by being formed as a unit with the tether and cap and being constructed shearable material. In other words, the operating of a fire extinguisher having lever which should have a lever pin operates without removal of the lever pin.

The tether may also be provided with a plate immediately adjacent the cap. The plate may include an indicia representing instructions as to the use of fire extinguisher. The plate would also serve as a flag to draw the attention of an operator that the seal has been removed and that there is a possibility that the fire extinguisher has been used or manipulated in some way.

It may be apparent that a novel and useful safety seal for an operating lever has been described.

It is therefore an object of the present invention to provide a safety seal for an operating lever which is usable on a fire extinguisher.

It is another object of the present invention to provide a safety seal for an operating lever which is shearable when the lever is operated without damaging the lever mechanism.

Another object of the present invention is to provide a safety sea for an operating lever which is reusable.

A further object of the present invention is to provide a safety seal for a fire extinguisher which includes means for flagging disengagement of the safety seal.

The invention possess other objects and advantages especially as concerns particular characteristics and features thereof which will become apparent as the specification continues.

For a better understanding of the invention reference is made to the following detailed description of the preferred embodiments thereof which should be referenced to the hereinabove described drawings.

DETAILED DESCRIPTION OF THE PREFERRED EMBODIMENTS

Various aspects of the present invention will evolve from the following detailed description of the preferred embodiments which should be taken in conjunction with the prior described drawings.

Figure 1:
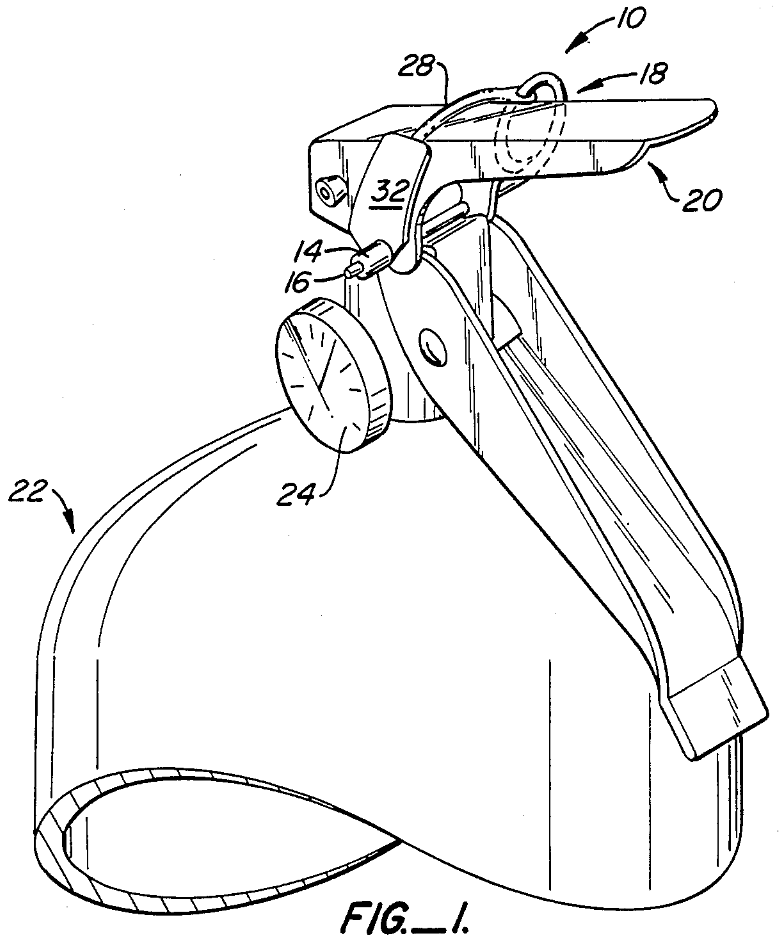
FIG. 1 is a top right perspective view of an operating lever on a fire extinguisher which is shown in part.
Figure 2:
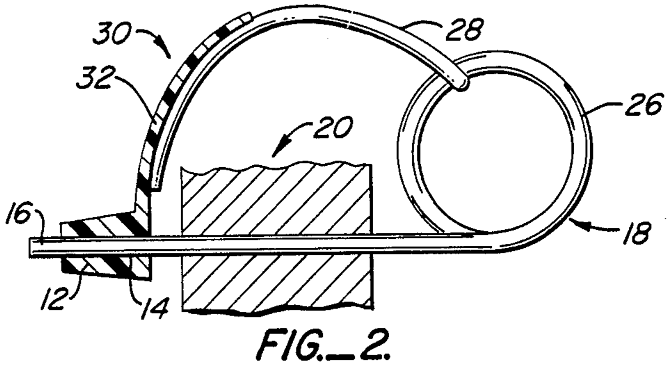
FIG. 2 is a sectional view of a fire extinguisher pin including the pin of the present invention.

The invention as a whole is represented in the drawings by reference character 10. The safety seal mechanism 10 includes as one of its elements a removable cap 12. With reference to FIG. 2 it may be seen that cap 12 is constructed of plastic material in the embodiment shown therein. Cap 12 includes an opening 14 which passes completely through cap 12. Opening 14 is sized to permit the end 16 of pin 18 to travel therethrough. With reference to FIG. 1, it may be observed that pin 18 is used in conjunction with a lever mechanism 20 employed on fire extinguisher 22. Pin 18 prevents lever mechanism from operating until it is removed therefrom, as is known in the prior art. Fire extinguisher 22 includes a meter or gage 24 which indicates the charge within fire extinguisher 22 of fire extinguisher powder.

Figure 3:
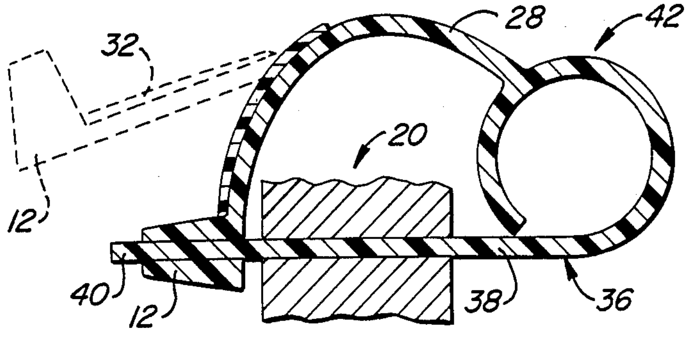
FIG. 3 is a sectional view of an embodiment of the seal and pin of the present invention in place in a fire extinguisher operating lever.

Returning to FIG. 2, pin 18 is depicted as a metallic pin having a ring end 26 on one side of lever mechanism 20 (shown schematically in FIGS. 2 and 3). Cap 12 is connected to ring end 26 of pin 18 by tether 28. Tether 28 may be formed of any flexible material such as plastic, metal and the like. As shown in FIG. 1, tether 28 passes over the top of lever mechanism 28 and is of sufficient length to permit cap 12 to slide off end 16 of ring 18 and back again. Tether 28 and cap 12 serve as a seal 30 for pin 18.

Figure 4:
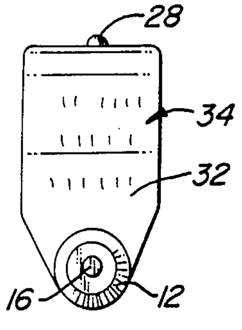
FIG. 4 is a left end view of the safety seal and pin of the embodiment shown in FIG. 3.

A plate or flat 32 is formed on tether 28 and may be attached to or be integral with tether 28. Flag 32 may contain indicia 34 advertising a service or source of supply, instructions on the use of a fire extinguisher 22, warnings of certain dangers, and the like, FIG. 4.

FIG. 3 decpicts another embodiment of the present invention in which the pin 36 employed with lever mechanism 20 is formed of plastic material and constructed integrally with tether 28 and cap 12. The shaft 38 of pin 36 would be shearable when lever mechanism 20 is operated thus, the user would not be required to remove pin 36 from lever 20 in an emergency. Tether 28, as depicted in FIG. 3, is of sufficient length again to permit cap 12 to be removed. Since tether 28 is somewhat flexible and springy, the position of cap 12 and flag 32 is shown in phantom on FIG. 3, when cap 12 has been removed from end 40 of pin 38. In this mode, an observer would be able to see that pin 38 has been touched in some manner. The combination of pin 26, tether 28 and cap 12 in FIG. 3 may be considered a seal mechanism 42.

In operation, the installer of seal 30 would insert pin 18 through lever mechanism 20. Cap 12 and tether 28 would be brought over the top of lever mechanism 20 and cap 12 would be pressed onto cap 16 of pin 18 to a place adjacent lever 20, as shown in FIG. 2. The same insertion technique would apply to the seal 42 shown in FIG. 3. Before using the lever mechanism with the seal 30 depicted in FIG. 2, the user would remove cap from the end 16 of pin 18. Seal 30 could then be replaced after recharging of the fire extinguisher 22 or where the fire extinguisher 22 is full and has not been recharged. Gage 24 would indicate the readiness condition of the fire extinguisher 22, in any case. Where seal 42 of FIG. 3 is employed with lever 20, the user merely squeezes lever 20 to operate the fire extinguisher 22. Shaft 38 of pin 36 will shear when this occurs. A new seal 42 must be used in this case after recharging the fire extinguisher 22. Flag 32 will be available for providing information to the user of fire extinguisher 22 and will rise to the position shown in FIG. 3 in phantom when cap 12 has been removed from pin 18 on 36.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A safety seal for an operating lever and a pin preventing operation of the lever, the lever pin including a shaft portion and a gripping portion connected thereto, the shaft and gripping portions of the lever pin extending to one and another sides of the lever, respectively comprising:

a. a cap, said cap being capable of covering the end of the shaft portion of the lever pin extending to one side of the lever, said cap frictionally engaging the end of the of the shaft portion of the lever pin sufficiently to prevent disengaging under gravitational force, but to allow disengagement by normal manual force; and b. a tether connected to said cap and extending to the gripping portion of the lever pin extending to the another side of the lever, said tether being connected to the gripping portion of the lever pin, said tether possessing sufficient length to permit removal of said cap from the end of the shaft portion of the lever pin with the lever pin in place in the lever.

2. The seal of claim 1 in which said tether, cap and the pin are formed as an integral unit and said pin portion of the integral unit is shearable by operation of the lever.

3. The seal of claim 1 in which cap includes an opening therethrough and the pin is capable of passing through said cap opening.

4. The seal of claim 3 which additionally includes a plate attached to said tether at a place adjacent said cap.

* * * * *